US007788339B1

(12) United States Patent
Srinivasan

(10) Patent No.: US 7,788,339 B1
(45) Date of Patent: Aug. 31, 2010

(54) SYSTEM AND METHOD FOR AUTOMATED DOWNLOAD OF MULTIMEDIA FILES

(75) Inventor: Thiru Srinivasan, Highlands Ranch, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/517,613

(22) Filed: Mar. 2, 2000

(51) Int. Cl.
*G06F 15/16* (2006.01)
(52) U.S. Cl. ...................... 709/219; 709/203
(58) Field of Classification Search ......... 709/200–207, 709/217–237; 345/733; 725/55–61; 715/747, 715/748
See application file for complete search history.

(56) References Cited

U.S. PATENT DOCUMENTS

| | | | | |
|---|---|---|---|---|
| 5,732,216 A | * | 3/1998 | Logan et al. ................. | 709/203 |
| 5,790,176 A | * | 8/1998 | Craig ........................... | 725/115 |
| 5,802,314 A | * | 9/1998 | Tullis et al. .................. | 709/246 |
| 5,956,321 A | * | 9/1999 | Yao et al. ..................... | 370/230 |
| 5,987,103 A | * | 11/1999 | Martino ..................... | 379/93.17 |
| 5,991,306 A | * | 11/1999 | Burns et al. .................. | 370/429 |
| 6,005,563 A | * | 12/1999 | White et al. ................. | 345/718 |
| 6,029,195 A | * | 2/2000 | Herz ........................... | 725/116 |
| 6,199,076 B1 | * | 3/2001 | Logan et al. ................. | 715/501.1 |
| 6,356,971 B1 | * | 3/2002 | Katz et al. .................... | 710/301 |
| 6,366,907 B1 | * | 4/2002 | Fanning et al. .................. | 707/3 |
| 6,370,543 B2 | * | 4/2002 | Hoffert et al. ............. | 707/104.1 |
| 6,389,467 B1 | * | 5/2002 | Eyal ............................. | 709/223 |
| 6,392,664 B1 | * | 5/2002 | White et al. ................. | 345/717 |
| 6,424,996 B1 | * | 7/2002 | Killcommons et al. ...... | 709/206 |
| 6,470,356 B1 | * | 10/2002 | Suzuki ..................... | 707/104.1 |
| 6,587,127 B1 | * | 7/2003 | Leeke et al. ................. | 345/765 |
| 6,601,237 B1 | * | 7/2003 | Ten Kate et al. ............... | 725/47 |
| 6,658,019 B1 | * | 12/2003 | Chen et al. .................. | 370/465 |
| 6,665,732 B1 | * | 12/2003 | Garofalakis et al. ......... | 709/247 |

* cited by examiner

*Primary Examiner*—David E England

(57) ABSTRACT

A system provides for the automated access and downloading of multimedia files according to a custom made listing. Prior to download, a listing of all multimedia files to be broadcast from at least one broadcast website on the Internet may be received and such information may be provided to a system user through use of a web browser incorporated in a personal computer. Once this listing is received, a system user may make selections as to the multimedia files to be downloaded and the dates and times that this shall occur. The system user may further provide information for future use as to the categories for the types of programs which the system will provide notice for. At the designated time, a file download module in the web browser will access the designated broadcast website and download the multimedia file to a designated location.

27 Claims, 9 Drawing Sheets

SYSTEM AND METHOD FOR AUTOMATED DOWNLOAD OF MULTIMEDIA FILES

FIELD OF THE INVENTION

The invention described herein relates to a system and method for scheduling downloads multimedia files and, then automatically downloading multimedia files, and more particularly, to generating a customized schedule for downloading multi-media files, wherein selections may be made from the schedule such that the files are either downloaded to memory for later viewing or viewed in real time.

BACKGROUND OF THE INVENTION

As the personal computer has become more sophisticated, many different types of software have been developed and distributed for playing multimedia files which include audio and/or video data. Many computer sellers now include multimedia players in computer operating systems when they are sold. Examples of these media players include Oracle video clients, Real Player, or Media Player from Microsoft, Inc.

Multimedia data may be delivered to a personal computer for playing through a number of different modes. These include CD ROMs or floppy disks which a system user may place in disk drive and then play using the multimedia software described above. Another source of multimedia information may be from downloads over the Internet. Currently a number of websites provide access to multimedia files which may be either downloaded for later viewing or viewed in real time.

If a system user wished to access multimedia files over the Internet, a connection must be first established manually with the particular website. Once the connection is established, a system user may view various HTML pages at the website to find a listing of multimedia files which may be accessed. Once a desired file is located, a hypertext link may be selected and the multimedia file either played or downloaded to memory. Depending on the type of connection the system user employs to connect to the Internet, this download may take minutes or hours and may occupy a significant amount of the computer's processing resources.

SUMMARY OF THE INVENTION

The inventor has recognized that with the number of websites currently offering access to multimedia files, it may be time consuming and inconvenient for a computer user to individually access these websites and then download the desired multimedia files manually. The inventor has further recognized that it would be advantageous to provide a system which provides for the centralized collection of a broadcast schedule, where a customized schedule may be provided to a system user through which desired programs may be selected and an automatic download for either storing or playing these files may be initiated at a desired time.

The invention described herein comprises a system which is connectable to a data network such as the Internet and includes the functionality to establish a connection with a plurality of nodes on the data network which may provide access to multimedia files. Also included in the system may be a scheduling device through which a listing of multimedia files may be presented. The listing may be configured to only include a selected number and/or type of multimedia files depending on a desired level of customization. An automatic download device may also be included in the system which provides for the automatic download and playing of multimedia files based on information generated by the scheduling device.

The scheduler portion of the system may be configured to receive information from a remote location which may include listings of multimedia files which may be organized according to customized topical headings. The collection of this information may be performed by a remotely located server device which accesses the multimedia sites and collects information with regards to the times at which certain multimedia files will be broadcast or become accessible. The scheduler may also be configured to include a scheduling interface which may be presented on a display screen of a personal computer within which it is resident. Included in the scheduling interface may be the listing of multimedia files organized according to customized headings.

The scheduling interface may be configured such that manual selections may be made as to multimedia files which may be downloaded and played or stored from the multimedia websites. As part of the selection process, times for the download may be chosen and automated processes may be employed to ensure that there are no conflicts between when different multimedia files are downloaded. Further, selections may be made as to whether the multimedia files will be played by a media player resident on the personal computer when downloaded, or the file will be stored in memory.

The system described herein may also include a multimedia download device which has access to customized schedule listing. At designated times, the download device may automatically access a multimedia website and download the identified multimedia file. Depending on selections made, the download device may play the multimedia file in realtime and/or store the file in memory.

The system described herein may be incorporated in a personal computer, and more particularly in a web-browsing tool resident in the personal computer employed for establishing connections with websites over the Internet. The web browser may include plug-ins which provide for the selection and scheduling of a customized listing of multimedia files to be downloaded, as well as the downloading mechanism for accessing and downloading the selected multimedia files.

Further, a centralized website on the Internet may be employed which is in communication with various multimedia websites such that a schedule of the multimedia files to be broadcast or made accessible from each site may be accessed and compiled into a custom listing according to selected topical headings. The centralized site may be further configured to periodically transmit a listing of multimedia files which is created according to predefined preferences. These preferences may include such things as the type of multimedia file which is to be download, such as audio or video, or it may be more specific in that it describes the subject matter or class of a particular file. For example, with regards to video files, descriptive headings may include such things as television programs and/or movies, and these headings may be further distinguished into topical heading such as comedies, dramas, or action adventure programming. Similar distinctions may also be made with regards to audio files which are to be downloaded. Further, these listings may further provide information as to downloading live events which are broadcast over the Internet such as sporting events or concerts.

As described above, the scheduler device may include an interface which is presented in order to make selections about the multimedia files which are to be downloaded by the system described herein. The scheduler may further include an additional interface for further customizing the types of multimedia files which will be downloaded in the listing for a particular system user. The interface provides for the selection of particular topical headings which the centralized website may then employ when creating a listing for a particular system user.

The other function included in the interface provides for the establishment of a schedule for downloading multimedia files from the multimedia websites. An option may be provided in the interface for either downloading and playing the multimedia files in real time, or downloading the selected multimedia files to memory such that they may be viewed at a future date. The interface may further be programmed to limit the number of multimedia files which may be downloaded to memory in order to not exceed a predetermined amount of memory. The file download device may be configured to automatically access the multimedia site when a multimedia file is scheduled to be played. Based on instructions received during the scheduling process, the download device may either initiate a media player which begins playing the multimedia file once the file streaming process begins, or the file is directed to be downloaded to a predetermined area of the memory.

In operation, broadcast schedules may be periodically received over the data network from a remote source such as a centralized server. These schedules may be compiled such that they are customized for the particular system which is receiving the listing. Once the broadcast schedule is received, it may be presented such that selections may be made for multimedia files which are to be downloaded to the system. At the time of making a selection, a distinction may also be made for each file with regards to whether it will be played in real time during the download, or stored in memory. Once the selections have been made from a particular schedule, this information is stored in memory.

At the times designated in the schedule, the web browser will establish a connection with the particular multimedia website which is providing access to the selected multimedia file. The download device either activates the external media player or identifies a segment in memory, and at that point, the chosen multimedia file may be downloaded. Once the download and playing or storing of the multimedia file is complete, the connection with the multimedia website may be terminated.

BRIEF DESCRIPTION OF THE DRAWINGS

FIG. 7 *a* and *b* disclose a flow chart which describes the functions for the scheduler plug-in.

FIG. 8 discloses a flow chart which describes the functions of the download plug-in.

DETAILED DESCRIPTION

Figure 1:
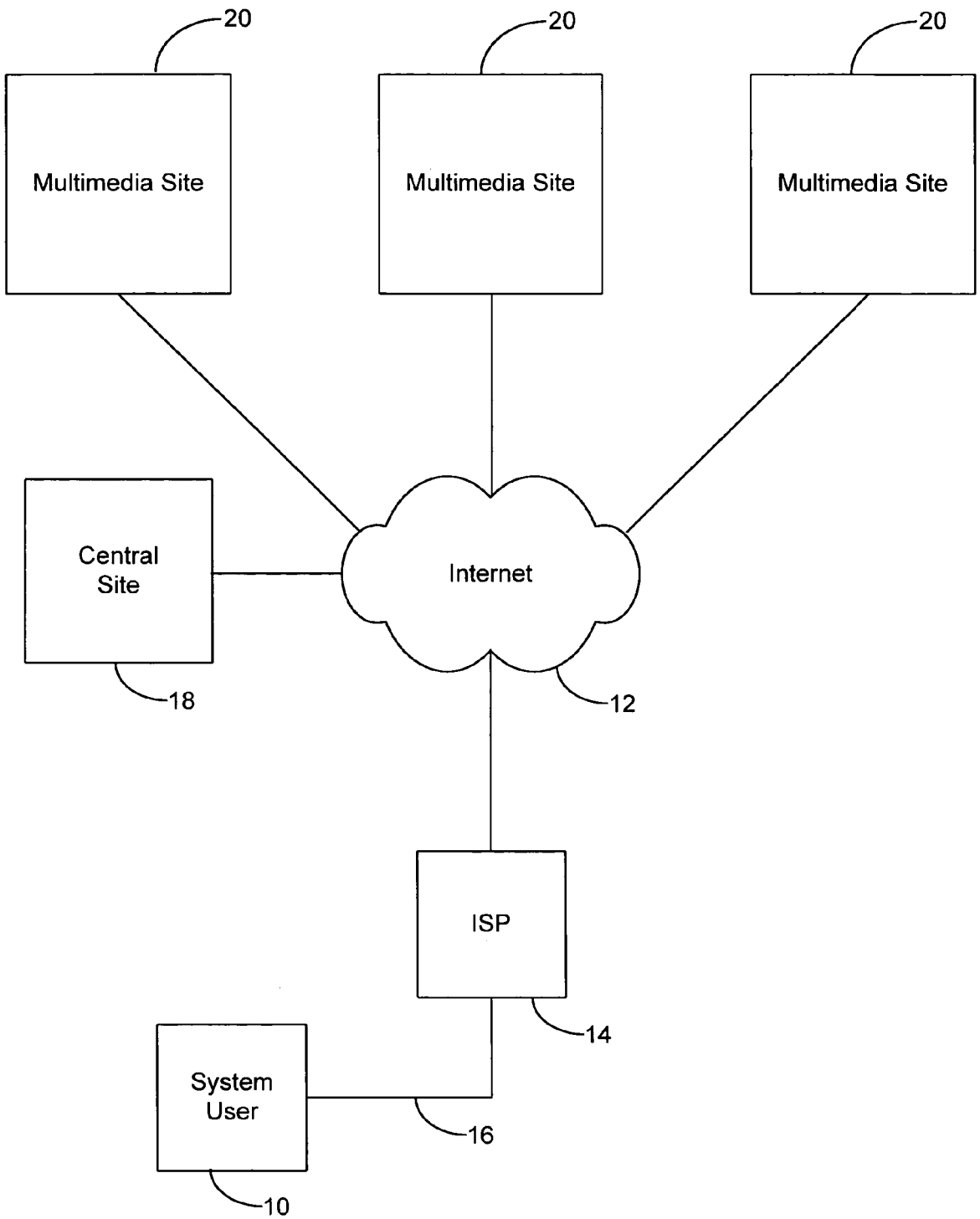
FIG. 1 discloses a system diagram which includes the various websites which provide information for the system described herein.

Disclosed in FIG. 1 is a diagram which discloses the communications environment in which the system described herein operates. The portions of the system described herein may be incorporated in a personal computer 10 which is configurable to establish connections with remote websites over a data network such as the Internet 12. The connection to the Internet may be provided through an Internet Service Provider (ISP) 14 to which the system user may establish a connection with over the telephone line 16.

Selected websites with which the system user may establish a connection include the centralized scheduling website 18. As will be described in greater detail below, this centralized website provides for the collection of multimedia access information from a number of other multimedia sites and provides for the organization and periodic transmission of this scheduling information to the system user 10. Further, multimedia websites 20 are accessible over the Internet and located thereon may be any number of multimedia files which may be downloaded, and recorded or played by the system user. Some example of websites which provide access to multimedia files include www.abcnews.com, www.cnn.com, and www.broadcast.com.

Figure 2:
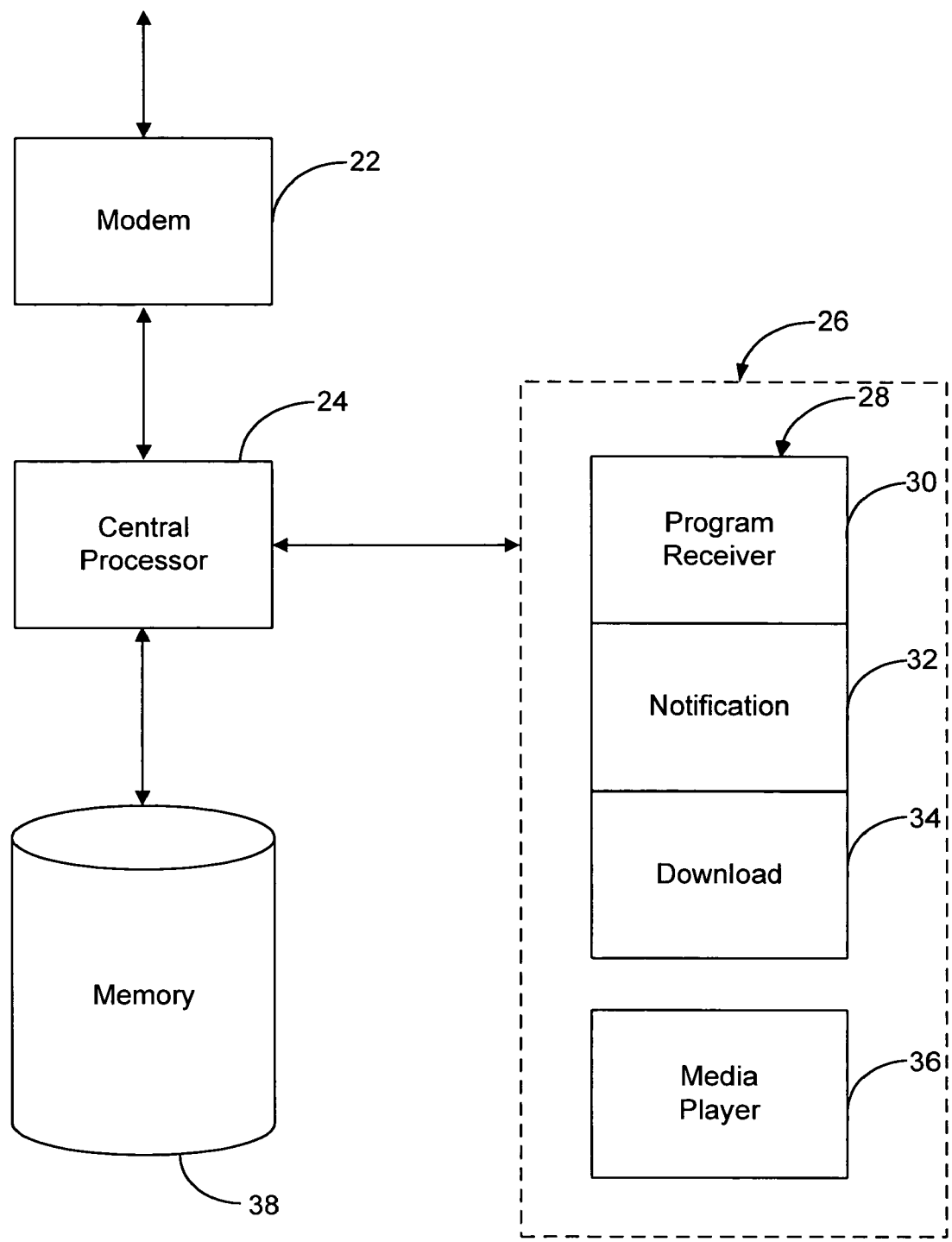
FIG. 2 discloses an internal system diagram for a personal computer which includes the system described herein.

Disclosed in FIG. 2 is a system diagram for a personal computer 10 which includes the automated multimedia file download system described herein. As was described above, the system user may establish a connection over the Internet through ISP 14. In order to establish a connection over the telephone lines, a modem 22 may be employed. Other connections to the Internet may also be employed such as a local area network (LAN) connection to the Internet. In connection with the modem 22 is central processor 24 which provides for the routing of signals within the system as well as directing the operations of the various processing modules.

Random Access Memory (RAM) 26 includes various processing modules which perform different functions for the system. One processing module in particular is the web browser 28 which is employed by the system user in order to establish connections with various websites on the Internet. Included in the web browser may be plug-in modules which are employed to perform various automated functions with regard to the selection and download of multimedia files. In particular, program receiver 30 provides for the receipt and presentation of schedule listings which may be received from the central site 18. Notification plug-in 32 provides notice to the system user of various functions to be performed by the system. The download plug-in 34 provides for accessing remote multimedia sites and the download of selected multimedia files.

Also included in RAM 26 may be the particular media player 36 which the system user is employing to play the downloaded media files on the personal computer. There may be media players for both audio and video files wherein such players may include products such as Oracle Video Client, Real Player from Real Networks, Inc. or Media Player from Microsoft, Inc. These players may be configured to either play a multimedia file in real time during download, or to play a multimedia file which has been stored in memory.

Also in connection with central processor 24 is memory 38. This memory may be employed by the system in order to store multimedia file listings received over the data network, or to store customized listings for downloading and playing multimedia files which have been created by a system user.

The systems and method described herein provide computer users, who have access to a data network such as the Internet, with the ability to automatically download and either play or store multimedia files from a multimedia website. As is known, many websites currently provide access to a number of different types of multimedia files. These files may provide for the viewing of video information, the playing of audio information or both. The formats of these multimedia files is well known. A number of websites also provide for the broadcast of live events in a multimedia file format. A system user may establish a connection with the website providing the broadcast and through use of a media player which includes bit streaming technology, the live event may be viewed and/or listened to in real time.

According to the system described herein, a web browser for a personal computer may be so modified as to provide for the scheduling and automatic download of selected multimedia files. The web browser may receive schedule information from remote sources that contain multimedia files provided by particular websites and then provide a mechanism by which multimedia files may be selected and scheduled for download. The web browser may be further configured such that when the scheduled time is reached, a connection is automatically established with a selected website and the download of the multimedia file may occur.

In operation, the first step which may performed is the acquisition of schedule information from the multimedia websites with regards to when the multimedia files may be accessed and downloaded. In order to gather this information each multimedia website which is going to provide access to multimedia files may generate a "read only" Hyper Text Markup Language (HTML) file called a schedule file. The schedule file may be automatically transferred using file transfer protocol (FTP) to the central website 18. On a periodic basis, the central website will receive the schedule file from each multimedia website. A processing module incorporated into the centralized website will organize the data received from the multimedia websites by category into a "read only" HTML file. This file is a consolidated representation of the program listing from the Internet.

More specifically, the central website organizes the received information such that the files to be broadcast are organized according to particular categories. These categories may include such things as to whether the file is an audio or video file. A video file may include such things as a television program, a movie or an independent production. Further delineations may be made such as, for example, whether a particular television program is a comedy, drama, action adventure, cartoon, etc. All the files to be downloaded are organized according to these categories before the listing is made available to the system users.

As was described above, the system user's personal computer includes a web browser for establishing connections over the Internet. Further, the web browser includes a number of plug-in processing modules for performing a number of automated functions for accessing and/or receiving the listing from the central website and downloading and playing and/or storing multimedia files from the multimedia websites. The program receiver plug-in 30 is employed to run in the background of a desktop for the computer and may request on a periodic basis particular portions of the program listing which the central website has created. The selections may be based on a user's preference for different categories included in the program listing. The request may contain a list of preselected categories of interests which the user has entered into the plug-in. The process of selecting categories will be described in more detail below.

Once the request is initiated by the plug-in, it is transmitted over the network to the centralized site which in turn provides a response which includes the requested multimedia file listing. The response received from the centralized site may be comprised of two parts. The first part may be a category file which is stored in the desktop and will help the user update the list of preconfigured categories of interests for files which are downloaded. The second part is either a portion or a copy of the entire audio/video guide which has been downloaded. The second part will be stored by the desktop in a file called program guide which includes a listing of the particular programs according to category. When the listing is received, an automated notice function may be employed to notify the user via E-mail that the latest schedule has been received.

Figure 3:
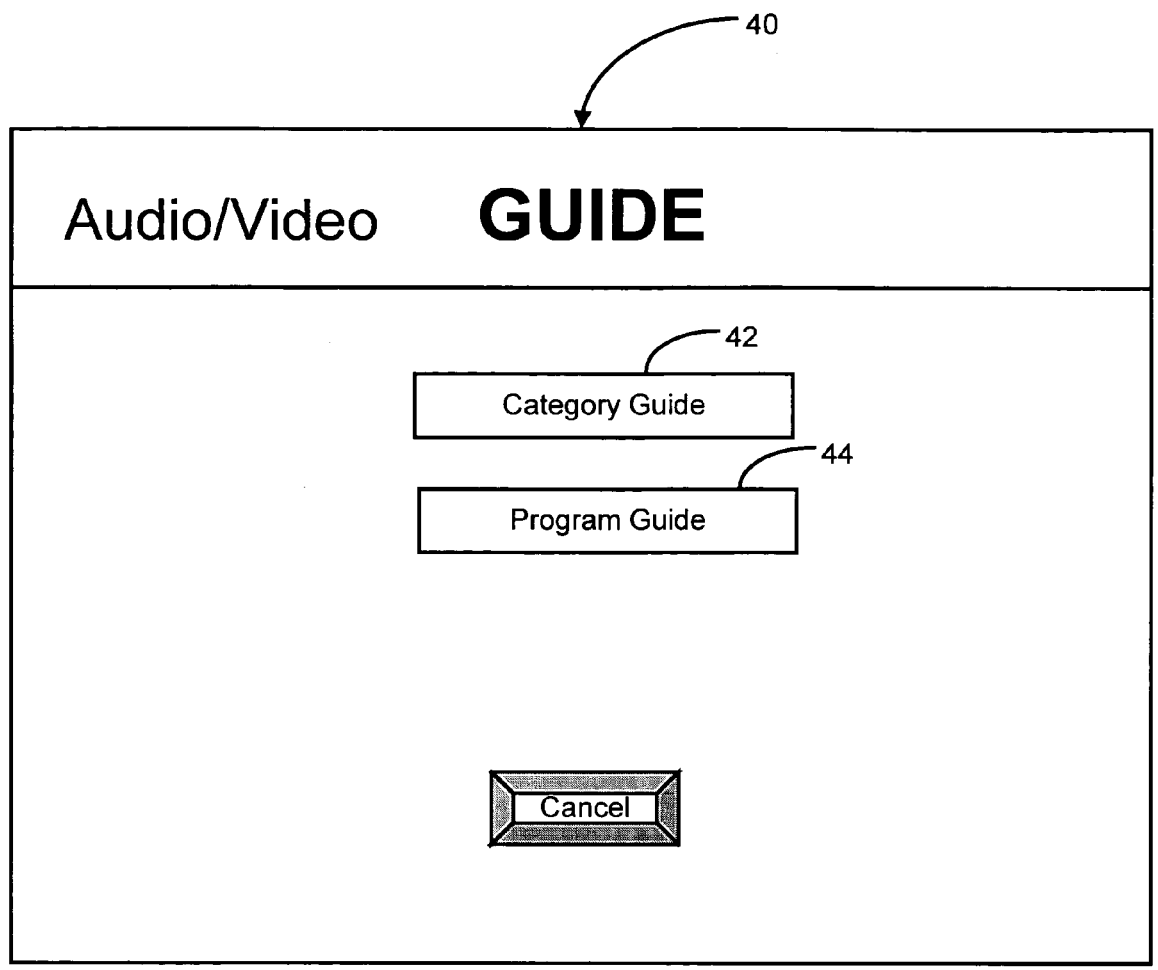
FIG. 3 discloses an interface through which the category or program guide may be selected.
Figure 4:
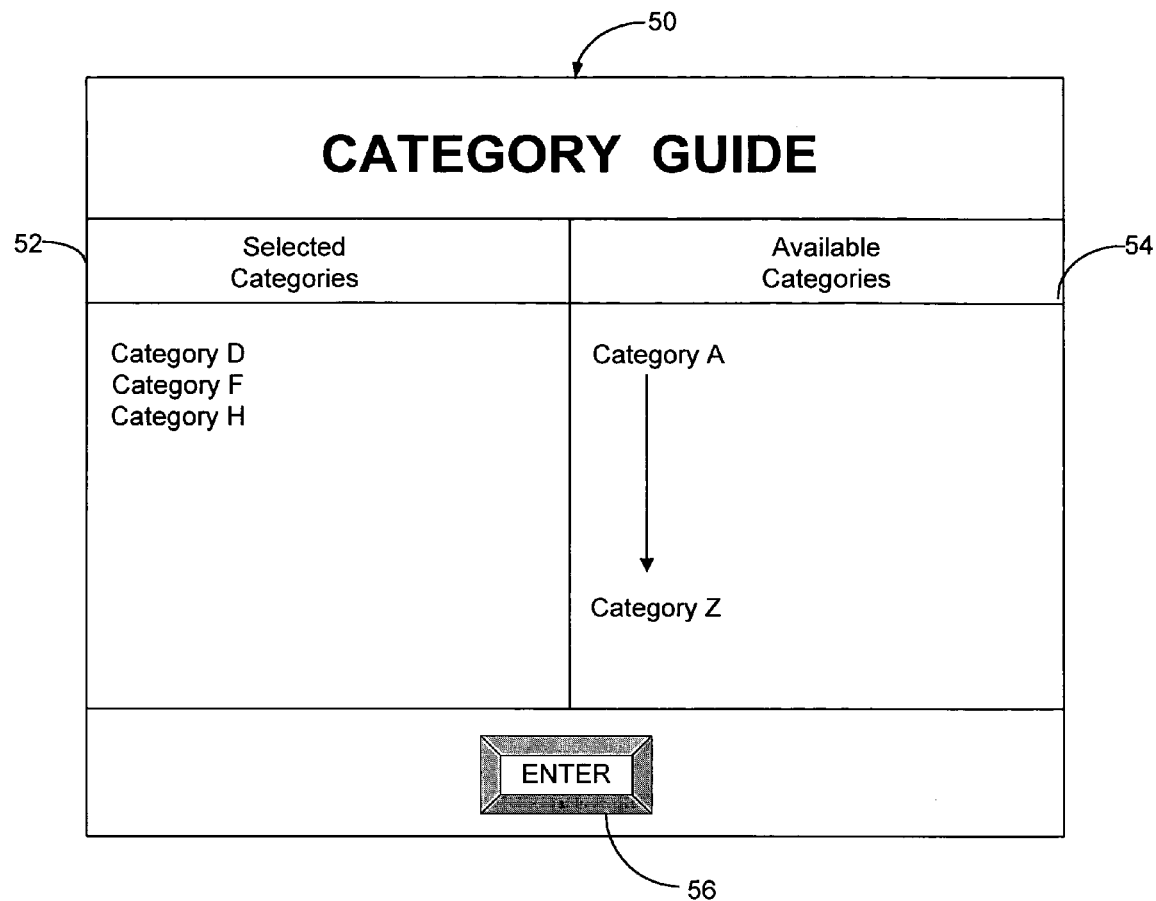
FIG. 4 discloses a screen display for the category guide.

Disclosed in FIG. 3 is a screen display 40 which a system user may view when the web browser is activated and the program listing received from the central website is to be viewed. As can be seen, the screen display 40 includes two selection buttons for either viewing the category guide 42 or the program guide 44. If the category guide 42 is selected, the screen display shown in FIG. 4 is presented. Screen display 50 includes two columns. In column 54, are all the available categories which the centralized website employs with regards to categorizing particular types of programs. In column 52 are the categories which the system user has selected for inclusion in their customized multimedia guide. The display shown in FIG. 4 is interactive such that selection may be made from either column 52 and/or 54 to add or remove categories. When this process is complete, the system user may select the "enter" button 56 and the system user's category selections may be updated. The web browser in turn will automatically provide this information to the centralized service such that when the next multimedia guide is received, only programs in the desired categories are included.

Figure 5:
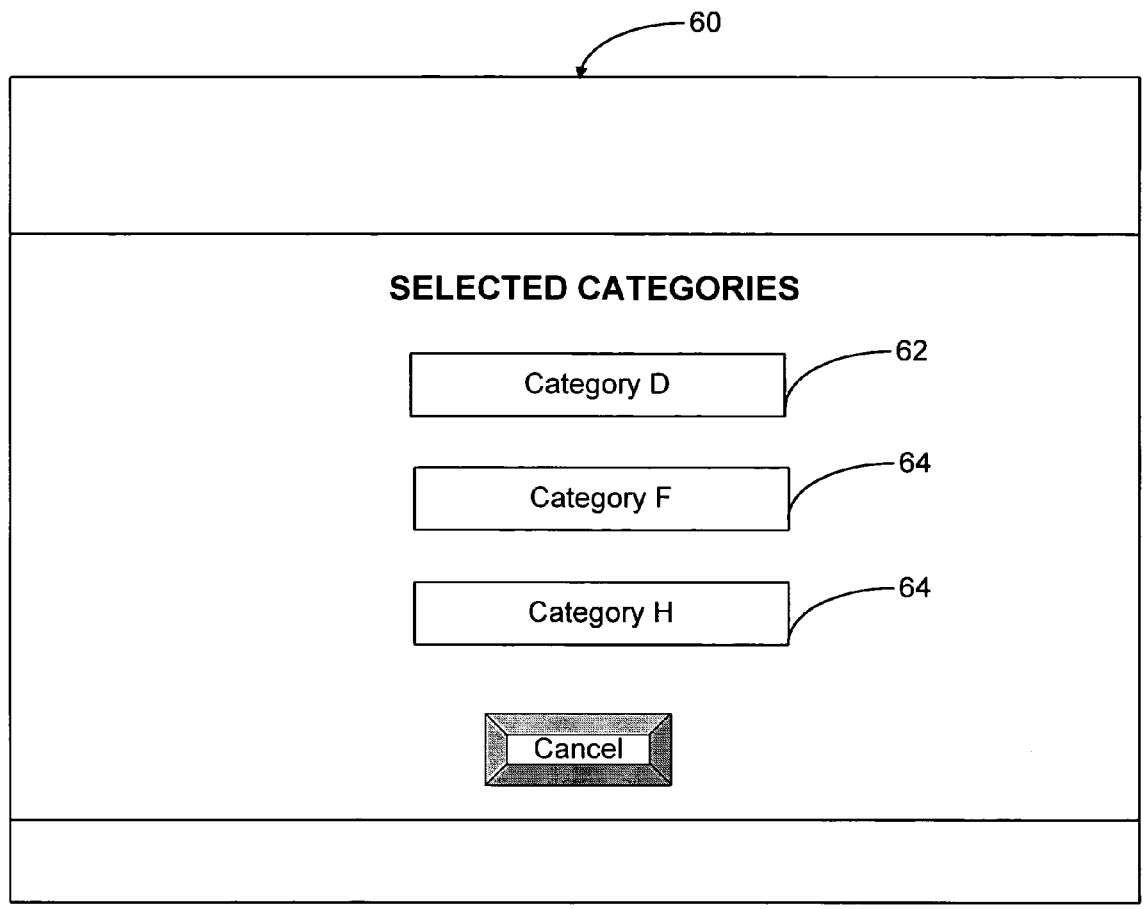
FIG. 5 discloses a screen display for the program guide.
Figure 6:
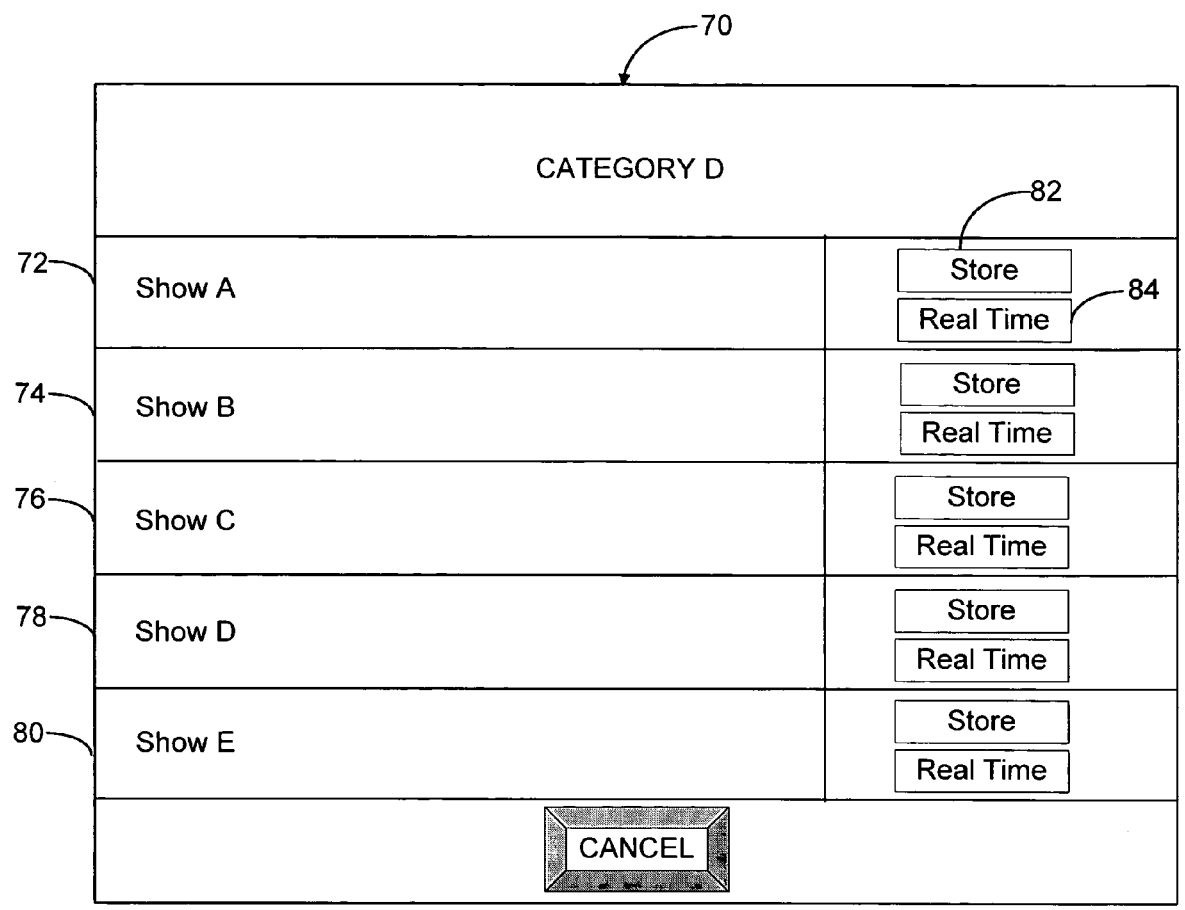
FIG. 6 discloses a screen display for a program listing for a particular category.

Returning again to FIG. 3, if the system user selects program guide 44 instead, the screen display 60 disclosed in FIG. 5 is presented. Included in this display are a number of graphical buttons which the system user may select in order to view downloaded multimedia files in particular categories. In the example shown in FIG. 5, three separate categories which match the user selected categories from FIG. 4 are provided. They are category D 62, category F 64, and category H 66. If the system user selects a particular category, the screen display 70 disclosed in FIG. 6 is presented.

In the example shown, category D has been selected and included in screen display 70 are a number of entries for the particular multimedia files which are classified as falling within category D. As can be seen, entries for shows 72-80 are provided. Included with each entry may be descriptive information which a system user may use in selecting a particular multimedia file to download. This descriptive information may include: title of the program, category, a short synopsis, when the multimedia file will become available, time of broadcast if the file is for a live event, and duration of the program. Also associated with each multimedia file selected are at least two buttons 82 and 84, which when selected, indicate that a system user wishes to download that particular multimedia file. The particular button selected will control the type of download for the file selected. As was described above, download options include a store function (button 82), which when selected, provide for the download of the selected multimedia file to a designated location in memory. The other option is real time play of the multimedia file (button 84), which provides for the playing of the file using a media player during the download. This is made possible through various bit streaming technologies which are well known to those in the art.

Figure 7A:
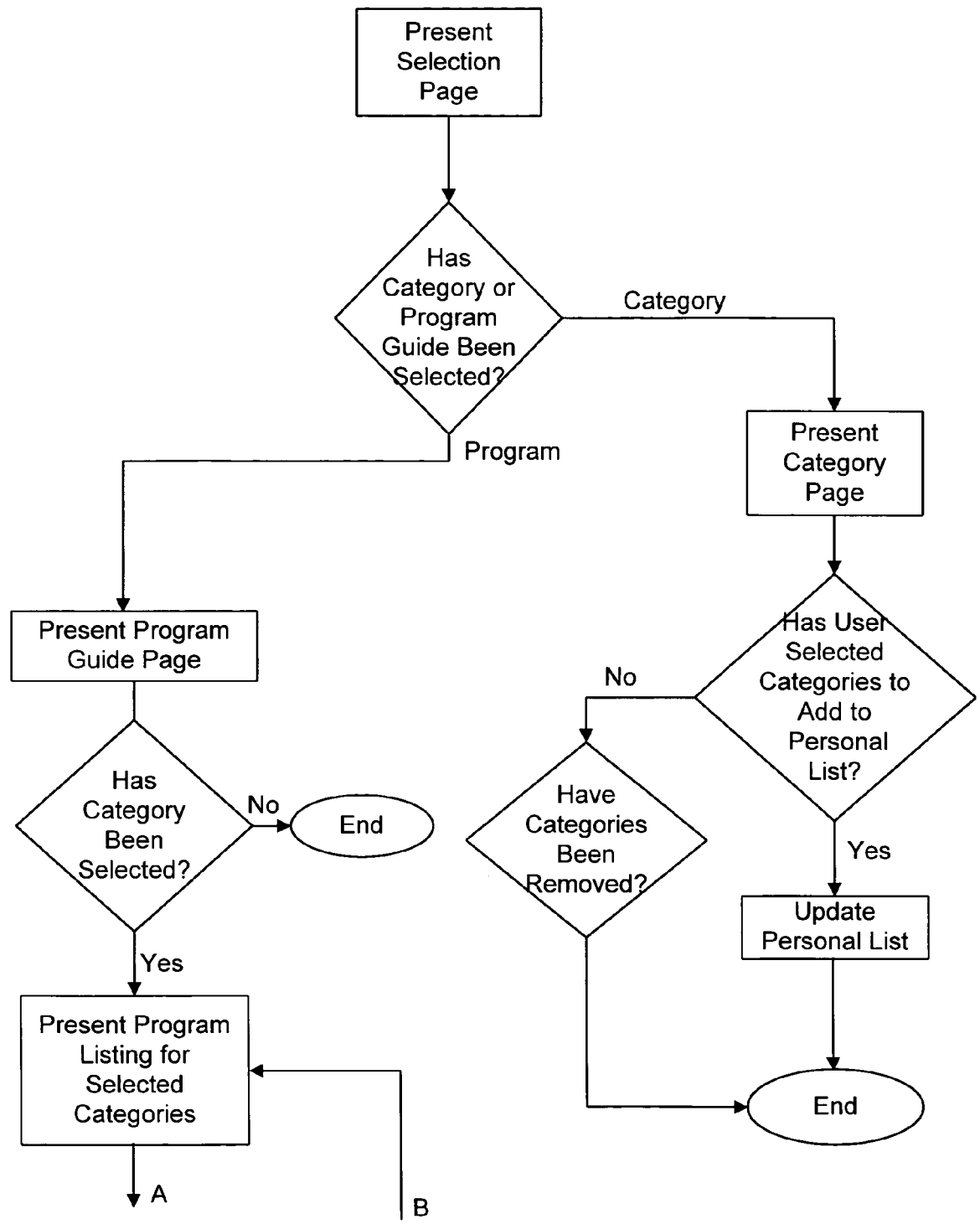
Figure 7B:
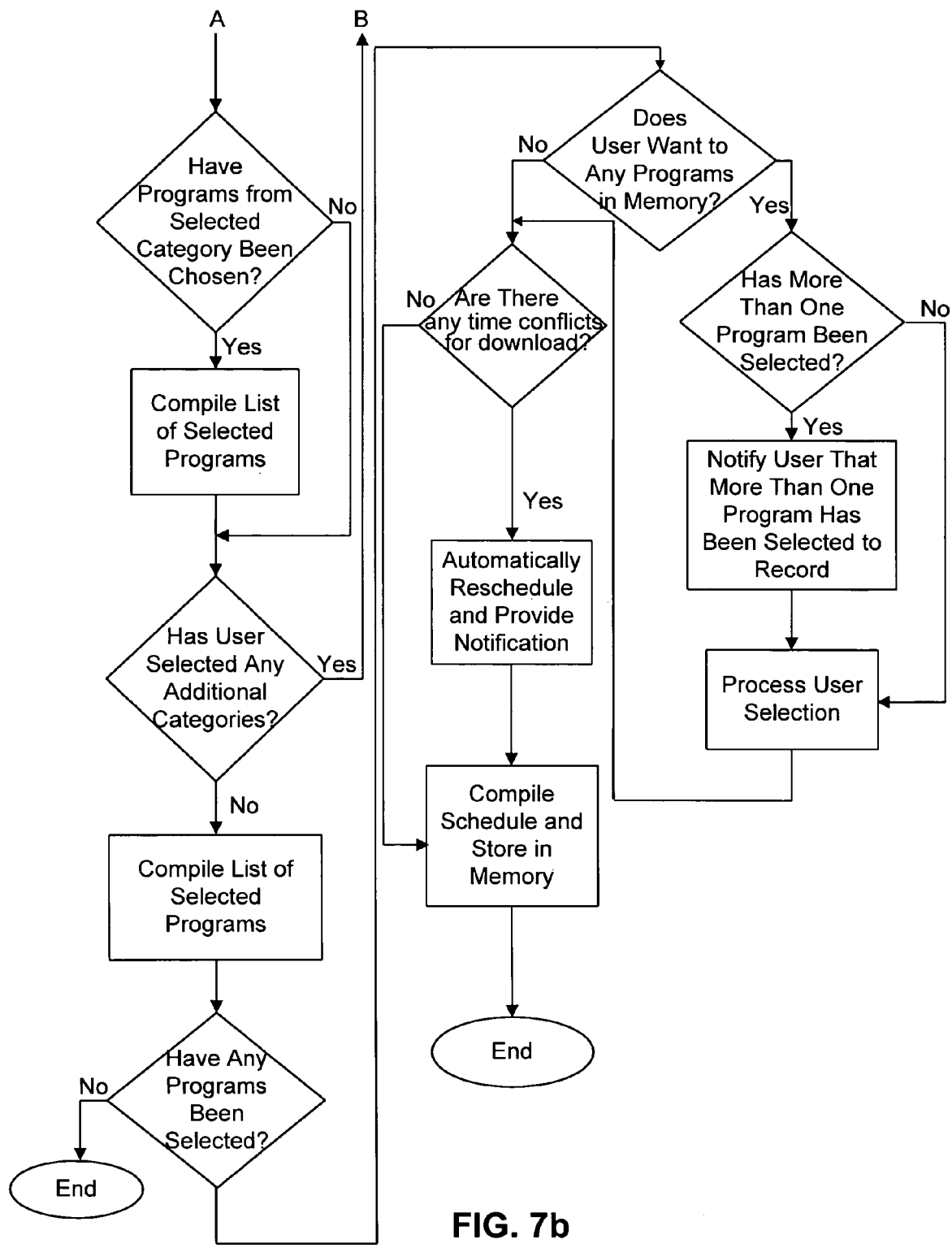

Disclosed in FIGS. 7a and b are flowcharts that describe in greater detail the operation performed by the system during the selection process of the multimedia files in creating a custom multimedia file download schedule. As was described above, once the scheduling plug in for the web browser is activated, a screen display for either scheduling downloads or selecting categories is presented. If the choice is made to schedule downloads, the multimedia listing provided by the central website is accessed. Once the listing is accessed the screen display shown in FIG. 5 is presented, and a selection may then be made as to which category file selections may be made. Once a category is selected, a screen display, such as that shown in FIG. 6, is presented which includes a listing of all the programs which fall within a particular category. Multimedia files may be selected for download through the interactive screen display. At this point the option is also provided for selecting the type of download. Once all the multimedia files to be downloaded are selected, the system will compile a list and create a download schedule.

As part of the compiling process, the system may then query as to whether any of the multimedia files are to be downloaded into memory. If the answer is yes, a further query is made as to whether the number of programs selected to download exceeds a predetermined number. Because the memory has limited capacity and many multimedia files, such as movie files, are extremely large, the number of multimedia files which may be downloaded is limited. If the number selected exceeds a predetermined number, a notification message is provided to the system user to reduce the number of programs which are to be downloaded to memory. Once a designation which falls within the predetermined limits is received, the files which are to be downloaded to memory are so identified in the listing.

A query is then made as to whether any conflicts exist between the designated times established for performing the downloads of the selected multimedia files. For this process, a comparison is made of all the times multimedia files are to be downloaded to determine if any conflicts exist. If a conflict is identified, an automated scheduler subroutine is initiated which moves one of the conflicting times to a different period such that all files may be downloaded at different times. After the rescheduling is complete, a notification may then be provided to the system user to inform them of the change in download time. At this point, the system user may do a manual reschedule. Once all of the procedures are complete for checking the files to be downloaded, the entire download schedule listing may then be stored in memory.

Figure 8:
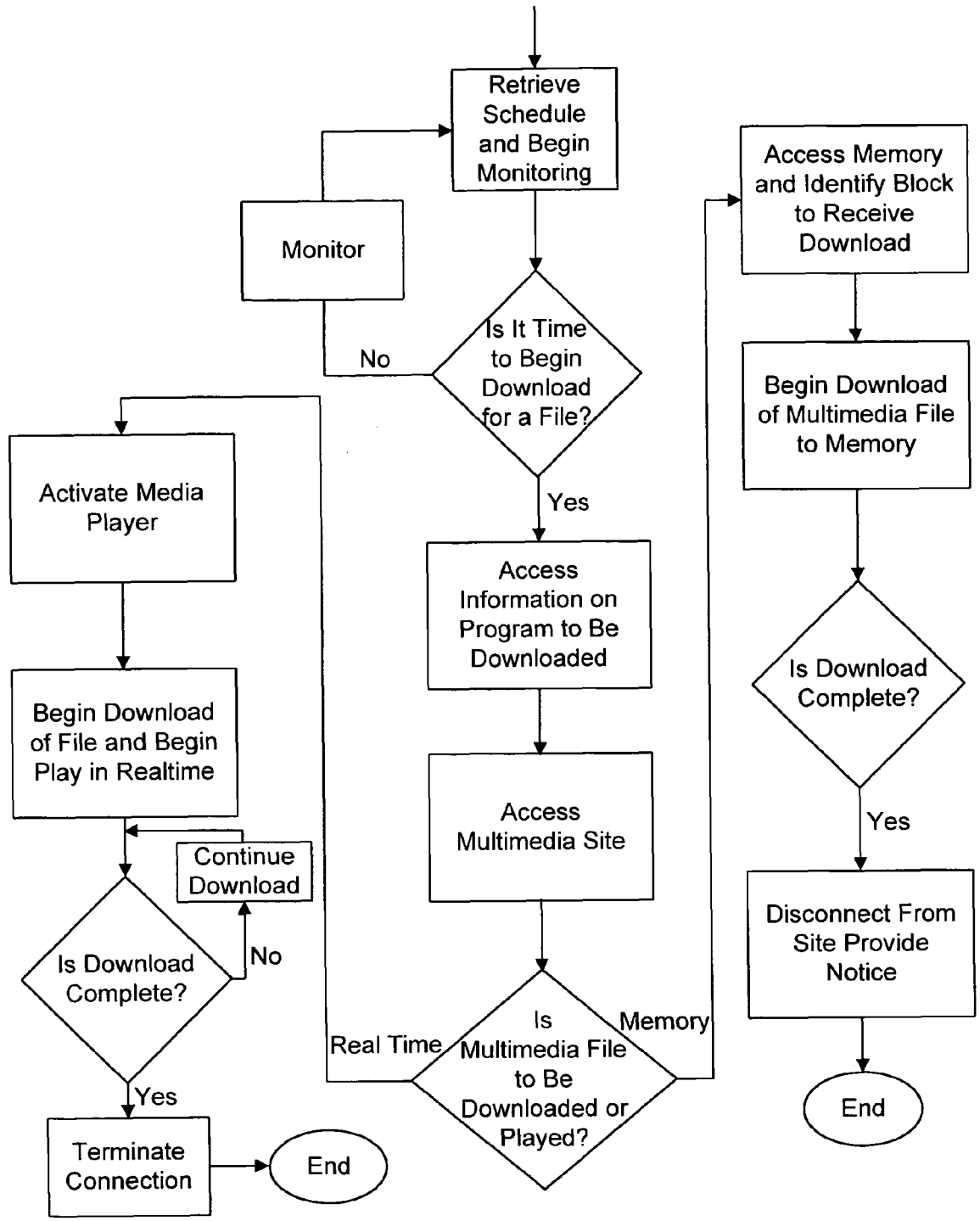

An example of a download schedule listing is disclosed in FIG. 8. Included in the schedule are all the multimedia files to be downloaded, the date and time of download, as well as the type of download (realtime play or to memory). This listing may be presented as a screen display which is accessible through the web browser.

Once the schedule is created, the automated download process may begin. Disclosed in FIG. 8 is a flowchart which describes the operations of the file downloader plug-in for the web browser. Using the download schedule the downloader plugin will begin a monitoring process to identify the times in which the downloads for particular multimedia files shall begin. Once the download time for a particular file is reached, the information for that listing is retrieved from memory and the file downloader establishes a connection with the broadcast site which provides access to the multimedia file. If the download plug-in is unable to establish a connection, a notification will be provided to the system user via a screen display and via an E-mail.

Once a connection is established with the multimedia website, the program listing is further analyzed to determine if it will be downloaded to memory or played in real time. If the file is to be played in real time, the download module then activates the appropriate media player for the type of multimedia file to be downloaded. A notification may also be provided to the system user via a screen display and via an E-mail that the download is to begin. Once the player is opened, the download and playing may begin and once the download is then complete, a notice may then be provided to the system user informing them of that fact.

If the multimedia file to be downloaded is to be played in realtime, the media player on which the multimedia file is to be played is accessed and activated. Once the media player is activated, the web browser sends a notification to the multimedia website to initiate the download of the multimedia file. When the download is complete the web browser terminates the connection with the multimedia website.

If the multimedia file is to be downloaded to memory, prior to the download process, the download module identifies a particular segment of memory to which the file will be downloaded. Once this has been done, the download is initiated and the multimedia file stored in memory. Once the download is complete, the system user may be notified via an E-mail and the connection with the multimedia website terminated. As was described above, the multimedia file stored in memory may be later accessed and played on the personal computer using a media player.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A system for automatically retrieving and playing multimedia files, comprising:
   a network access interface which provides access to a data network;
   a processing module in a centralized scheduling website to automatically collect information including first identifier of a first multimedia file, a first location of said first multimedia file and a first schedule of the availability of said first multimedia file, wherein said processing module creates first categorization information relating to said first multimedia file;
   wherein said processing module automatically collects information including a second identifier of a second multimedia file, a second location of said second multimedia file and a second schedule of the availability of said second multimedia file, wherein said processing module creates second categorization information relating to said second multimedia file;
   wherein said processing module, said first location, and said second location are situated within distinct domains within the data network;
   wherein said processing module automatically compiles a consolidated Internet program listing containing the collected information;
   a web browser plug-in selection interface in communication with said processing module which provides for automatic presentation of the collected information, and automatically receives and processes a selection from a client computer for accessing at least the first multimedia file according to the first schedule of the availability of the first multimedia file and the second multimedia file according to the second schedule of the availability of the second multimedia file from the data network and compiles a download schedule; and a file download device in communication with the selection interface which, based on the download schedule, automatically accesses said first and second multimedia files at said location through said network access interface and downloads the selected multimedia files.

2. The system of claim 1, wherein the processing module in the centralized scheduling website receives a schedule file from each of a plurality of remote multimedia websites on a periodic basis, each schedule file comprising schedule of availability information for at least one multimedia file and wherein a first schedule file comprises the first schedule of the availability of the first multimedia file and a second schedule file comprises the second schedule of the availability of the second multimedia file.

3. The system of claim 2, further comprising a receiver plug-in module on a client computer to automatically request and receive one or more portions of a program listing created by the processing module on the centralized scheduling website, in response to receiving the schedule file from each of the plurality of remote multimedia websites.

4. The system of claim 3, wherein the program listing comprises a user's multimedia file category preferences and the received schedule of availability information for each multimedia file.

5. The system of claim 1 wherein at least one of the selection interface and the file download device are configured as plugins in a web browser installed in the client computer.

6. The system of claim 1 wherein,
the multimedia file comprises a live event; and,
the selection interface includes at least one of:
 a first selection for real time play of said live event; and
 a second selection for storing in a memory said live event.

7. The system of claim 6 wherein the system includes a media player for playing said first multimedia file in real time.

8. The system of claim 1 wherein an interface is provided for restricting categories of multimedia files to be presented by the selection interface.

9. The system of claim 1, wherein the file download device:
determines whether any conflicts exist in the download schedule compiled by the web browser plug-in selection interface;
automatically reschedules at least one download in response to a determination that a conflict exists in the download schedule; and
provides a notification that the download schedule has been changed.

10. A method of retrieving multimedia files over a data network from a remote site in connection with the data network, comprising
in a centralized scheduling web-site:
 collecting identity information and download availability information for a plurality of multimedia files in a plurality of multimedia websites, wherein said plurality of multimedia websites comprise at least two websites in distinct domains of the data network and wherein said availability information comprises at least one time when at least one of said plurality of multimedia files are available for download;
 categorizing said plurality of multimedia files;
 creating a consolidated Internet program listing containing said identity information and said download availability information; in a client computer:
 presenting an interactive interface in a web browser through a first web browser plug-in which includes the listing and though which individual selections may be made for downloading at least one of the plurality of the multimedia files from at least one of the plurality of multimedia websites according to the listing on the centralized scheduling website of when the at least one of the plurality of the multimedia files is available;
 receiving an input through the interactive interface in the first web browser plug-in selecting a particular number of the plurality of multimedia files from the listing;
 compiling a download schedule based on the received input, wherein the schedule includes a description of the multimedia files selected, day and time for the download, and download information, including the domain; and
 based on the input received through the interface in the web browser, accessing and downloading over the data network through a second web browser plug-in, the selected multimedia files from the selected multimedia websites.

11. The method of claim 10 further comprising at least one of:
storing the multimedia files in memory through a third web-browser plug-in; and
playing the selected multimedia files through the third web-browser plug-in.

12. The method of claim 11 wherein only a predetermined number of multimedia files may be stored in memory.

13. The method of claim 10 wherein the multimedia files are automatically retrieved by the second web browser plug-in at the day and time available for download according to the download schedule.

14. The method of claim 13 wherein any scheduling conflicts between the downloading of multimedia files are detected and the downloading is rescheduled as necessary to resolve conflicts through an automated scheduler subroutine.

15. The method of claim 10, wherein the data network is the Internet.

16. The method of claim 10 wherein the listing is created based on topical categories.

17. The method of claim 16 wherein the topical categories are amended based on the received inputs.

18. The method of claim 10 wherein the identity information and download availability information is created and transmitted automatically on a periodic basis.

19. The method of claim 10, further comprising:
determining whether any conflicts exist in the download schedule compiled by the web browser plug-in selection interface;
automatically rescheduling at least one download in response to a determination that a conflict exists in the download schedule; and
provides a notification that the download schedule has been changed.

20. The method of claim 10 wherein, collecting identity information and download availability information for a plurality of multimedia files in a plurality of multimedia websites comprises, transferring a read-only HTML file from each of the plurality of multimedia websites to the centralized scheduling website.

21. The method of claim 20, wherein transferring a read-only HTML from each of the plurality of multimedia websites to the centralized scheduling website comprises, automatically transferring each of the read-only HTML files from each of the plurality of multimedia websites to the centralized scheduling website on a periodic basis without first receiving a request for each of the read-only HTML files from the centralized scheduling website prior to each transfer.

22. A system for automatically retrieving and playing multimedia files, comprising:

a network access interface which provides access to a data network;

a scheduler adapted to operate on a centralized scheduling website connected to the data network, search a plurality of distinct additional websites for multimedia files, obtain a schedule of availability of times when said multimedia files are available for download, categorize said multimedia files and create a first list containing category information about said multimedia files;

a device web browser program receiver plug-in in communication with said scheduler which compiles a download schedule and, requests one or more portions of the first list from the scheduler, wherein at least one of the one or more portions are requested from the scheduler according to a user's category preferences, receives the one or more portions of the first list from the scheduler, the one or more portions of the first list received from the scheduler comprising a first part and a second part, the first part comprising a category listing and the second part comprising an entire first list, stores the first and second parts on desktop computer.

23. The system of claim 22, wherein the file download device:

determines whether any conflicts exist in the download schedule compiled by the selection interface;

automatically reschedules at least one download in response to a determination that a conflict exists in the download schedule; and provides a notification that the download schedule has been changed.

24. The system of claim 22 wherein, the first part is used to update a preconfigured category list on the device; and the device web browser program receiver plugin is adapted to display on a display screen, the updated preconfigured category list upon a user selecting the first part, and the entire first list upon the user selecting the second part.

25. The system of claim 24 wherein, when the first part is selected, the display screen displays a first column comprising the updated preconfigured category list and a second column comprising an entire category list of the first list;

a new updated preconfigured category list is displayed when one of, categories are deleted from the first column and categories are copied from the second column to the first column; and the device web browser plug-in is adapted to automatically provide the centralized scheduling website the new preconfigured updated category list so that only desired categories are received from the scheduler in the first part of the first list in response to future requests.

26. The system of claim 24 wherein, when the first part is selected, the display screen displays one or more graphical selections, each graphical selection corresponding to at least one of the categories from the updated preconfigured category list; and when one of the one or more graphical selections are selected, the display screen displays one or more multimedia files corresponding to the category of the graphical selection.

27. The system of claim 22 further comprising, an electronic notification system in electronic communication with a user wherein, when the first part and the second part of the first list are received, the electronic notification system electronically notifies the user that the first list has been received at the device.

* * * * *

UNITED STATES PATENT AND TRADEMARK OFFICE
CERTIFICATE OF CORRECTION

PATENT NO. : 7,788,339 B1
APPLICATION NO. : 09/517613
DATED : August 31, 2010
INVENTOR(S) : Thiru Srinivasan It is certified that error appears in the above-identified patent and that said Letters Patent is hereby corrected as shown below:

Column 1, Line 7, delete "downloads multimedia files" and insert --downloads of multimedia files--, therefor.

Column 2, Line 28, delete "to customized" and insert --to a customized--, therefor.

Column 2, Line 51, delete "be download," and insert --be downloaded,--, therefor.

Column 5, Line 17, delete "may performed" and insert --may be performed--, therefor.

Signed and Sealed this

Sixteenth Day of November, 2010

David J. Kappos
*Director of the United States Patent and Trademark Office*